April 7, 1964     C. H. FRICK     3,127,734
GOVERNOR CONTROL MECHANISM
Original Filed Dec. 27, 1954     4 Sheets-Sheet 1

INVENTOR
Charles H. Frick
BY
E. E. James
ATTORNEY

April 7, 1964
C. H. FRICK
3,127,734
GOVERNOR CONTROL MECHANISM
Original Filed Dec. 27, 1954
4 Sheets-Sheet 2
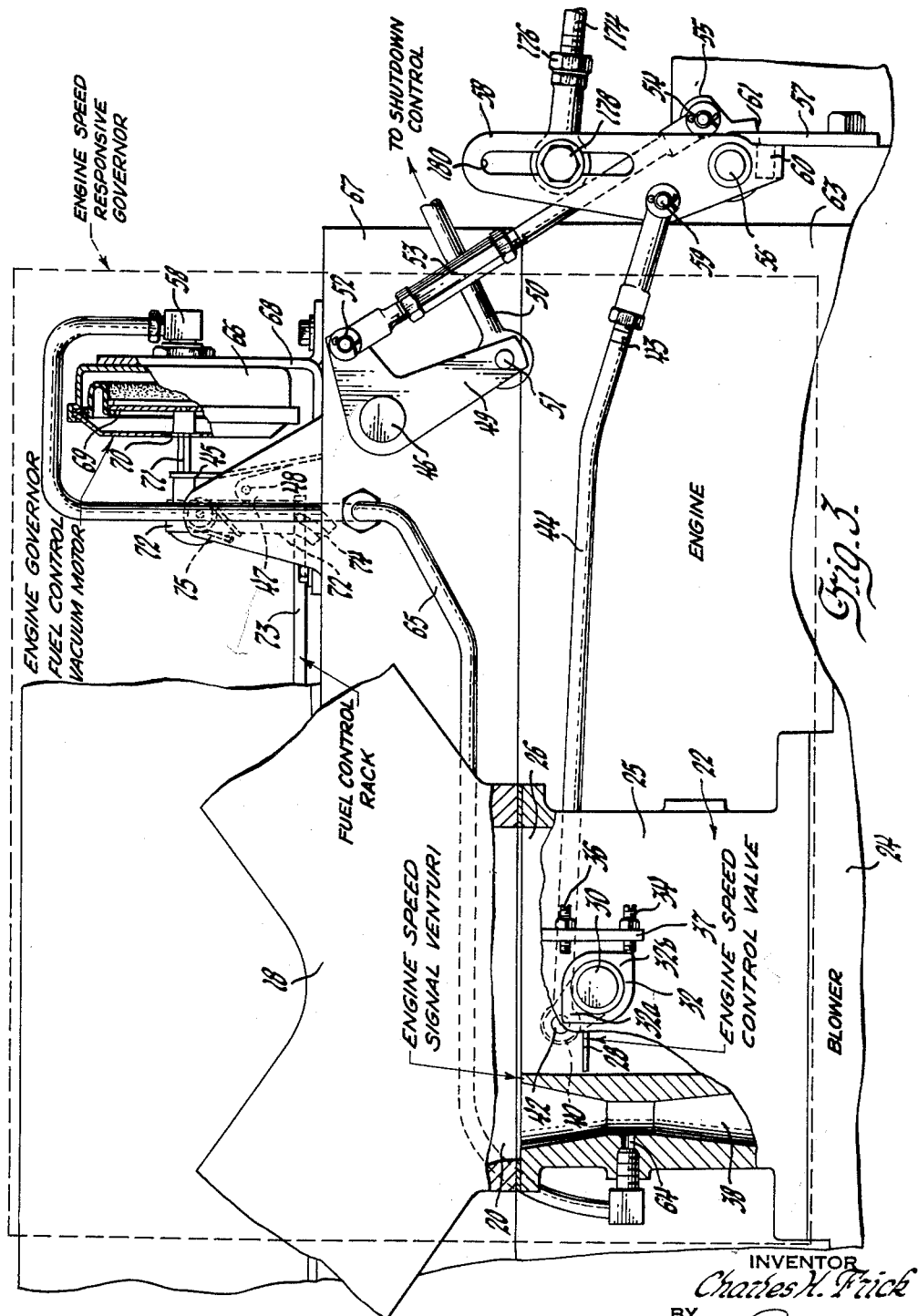

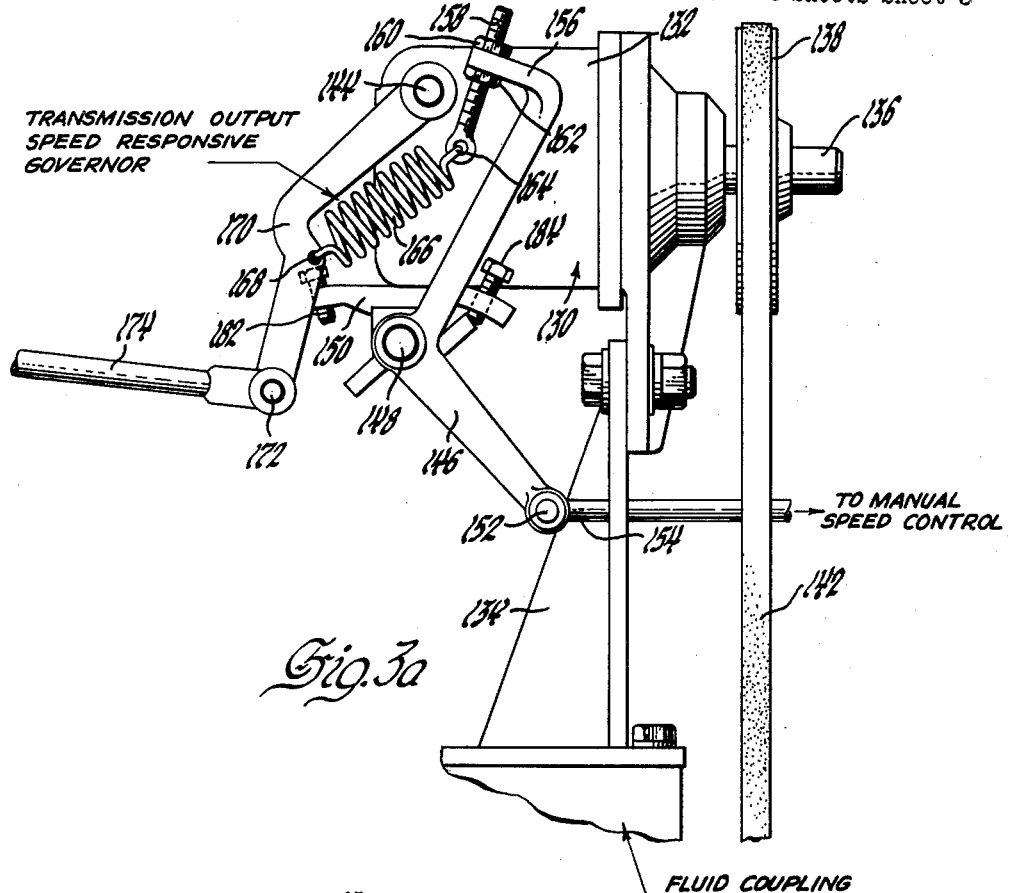
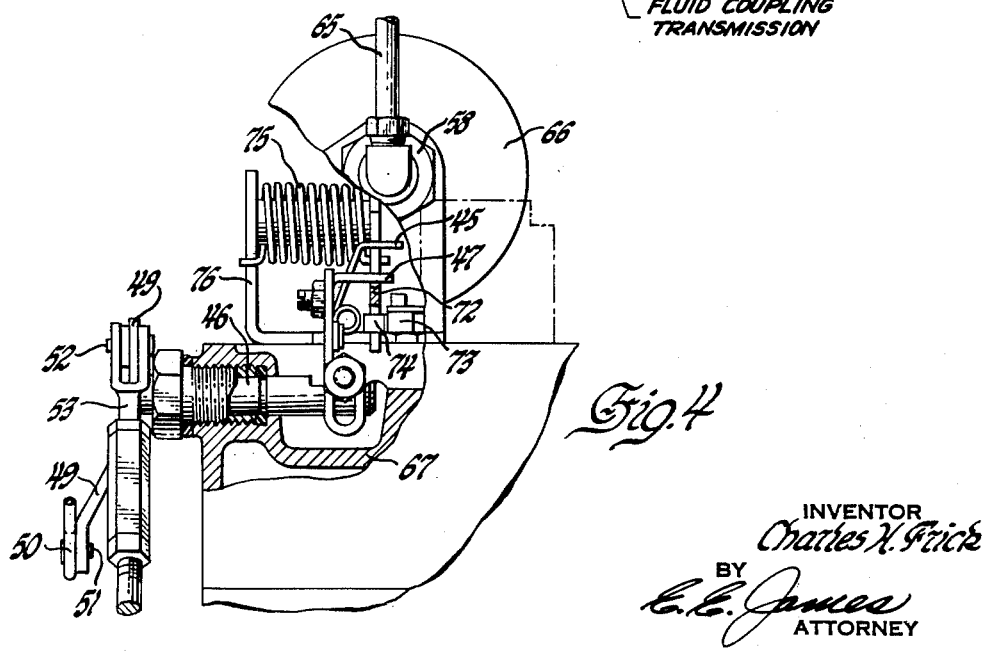

April 7, 1964 C. H. FRICK 3,127,734
GOVERNOR CONTROL MECHANISM
Original Filed Dec. 27, 1954 4 Sheets-Sheet 4

Inventor
Charles H. Frick
By E. E. James
Attorney

United States Patent Office 3,127,734
Patented Apr. 7, 1964

3,127,734
GOVERNOR CONTROL MECHANISM
Charles H. Frick, Pontiac, Mich., assignor to General Motors Corporation, Detroit, Mich., a corporation of Delaware
Continuation of applications Ser. No. 477,809 and Ser. No. 477,857, Dec. 27, 1954. This application May 9, 1960, Ser. No. 27,901
7 Claims. (Cl. 60—12)

This invention relates to a control mechanism for a power plant and more particularly to a control mechanism for a power plant including an internal combustion engine drivingly connected to a power transmitting mechanism.

This is a continuation consolidating copending applications Serial No. 477,809 and Serial No. 477,857, which were filed December 27, 1954, and are now abandoned.

It is one of the principal objects of the invention to provide a power plant of the type described with an engine fuel supply control mechanism responsive to the respective speeds of the engine and the driven output shaft of the power transmitting mechanism and modifying the governed engine speed characteristic to maintain selected speed characteristics of a driven output shaft of the power transmitting mechanism with variations in the application of load.

The invention has particular application to an internal combustion engine power plant in which the driven output shaft of the power transmitting coupling mechanism has droop characteristics under load differing from those of the engine such as in the case with torque-converter and eddy-current type couplings. In such power plants, the rate of operation of the engine tends to decrease with increased application of load and the rate of operation of the output shaft further tends to decrease relative to the rate of operation in the engine due to the slippage characteristics of such couplings. These characteristics result in an accumulative reduction in the power available at the output shaft. The invention is not limited to power plants of this particular type, however, being considered applicable to internal combustion engine power plants including power transmitting mechanisms generally to modify the droop characteristics of the engine upon application of load thereby increasing the power available at the output shaft.

Among the several primary objects of the invention are to provide a power plant of the type described with control mechanism including an engine speed-responsive governor and an output shaft speed-responsive governor which are cooperatively interconnected to modify the operation of a fuel supply mechanism to maintain a desired output shaft speed; to provide such a power plant with a control mechanism including an engine speed-responsive governor and an output shaft responsive governor which are cooperatively interconnected to modify the operation of an engine fuel supply mechanism and having a manual control for varying the speed-responsive action of one of the governors thereby varying the selected output shaft speed at which the power plant is governed; and to provide such a power plant with a control mechanism including a fuel supply control mechanism, a variable-speed governor mechanism responsive to the speed of the engine and operably connected to the fuel control mechanism to control the fuel supply and thereby the speed of the engine, and a second governor responsive to the speed of the output shaft of the power transmitting mechanism and operable to modify the engine speed-responsive characteristic or fuel supply controlling action of the first governor.

With regard to a first illustrative embodiment hereinafter shown and described, certain further and more specific objects of the invention are to provide a power plant of the type described with an engine fuel supply control mechanism controllable by an engine speed-responsive governor and having a variable-speed governor responsive to the speed of the power transmitting output shaft and operatively connected to modify the fuel-controlling operation of the engine governor to maintain a desired output shaft speed; to provide such a power plant with a control mechanism including a fuel control member, a variable-speed governor mechanism responsive to the speed of the engine and operably connected to the fuel control member to control the speed of the engine, and a second variable-speed governor responsive to the speed of the power transmitting output shaft and operable to vary the engine speed responsive characteristic or setting and thus the fuel supply controlling action of the first governor to maintain a selected output shaft speed; and to provide a power plant including an internal combustion engine and a power transmitting mechanism having inherent slippage characteristics with a fuel control mechanism including a fuel supply control member, a variable-speed vacuum governor responsive to sub-atmospheric pressure existing in a portion of the engine air intake system and operably connected to the fuel control member to control the fuel supply and thereby the speed of the engine, and an output-shaft driven variable-speed centrifugal governor operable to control the sub-atmospheric pressure existing in the portion of the intake system which is applied to the vacuum governor thereby maintaining the selected output shaft speed.

With regard to a second illustrative embodiment, certain further and more specific objects of the invention are to provide a power plant including an internal combustion engine and a power transmitting mechanism having inherent slippage characteristics with a control mechanism including a fuel supply control mechanism, a manually controlled variable-speed governor mechanism responsive to the speed of the engine and operably connected to the fuel control mechanism to control the fuel supply and thereby the speed of the engine, and a second governor responsive to the speed of the output shaft of the power transmitting mechanism and operable to modify the engine speed-responsive characteristic and fuel supply controlling action of the first governor to maintain the selected output shaft speed; and to provide such a power plant with a control mechanism comprising a fuel control mechanism which is operably connected to and controlled by a variable-speed vacuum governor, the vacuum governor being responsive to an engine speed indicative of sub-atmospheric pressure existing in a portion of the engine intake manifold and including a manually controlled valve in the intake operable to vary the engine speed indicative pressure signal applied to the vacuum governor and thereby the engine speed maintaining characteristic thereof, and an output shaft driven speed-sensitive variable orifice governor modifying the application of the sub-atmospheric intake manifold pressure to the vacuum governor to modulate the fuel controlling action of the vacuum governor to thereby maintain the desired output shaft speed as initially selected by the positioning of the manual valve.

The foregoing and other objects, advantages and features of the invention will be more thoroughly understood from the following description of the several illustrative embodiments having reference to the accompanying drawings, in which:

FIGURE 3 is an enlarged detailed view of a portion of FIGURE 1 with portions thereof broken away and in section;

FIGURE 3a is an enlarged detailed view of another portion of FIGURE 1 and is complementary to that portion shown in FIGURE 3;

FIGURE 4 is a view complementary to FIGURE 2 and shows a portion of the control mechanism of FIGURE 1 with portions thereof broken away and in section;

Figure 1:
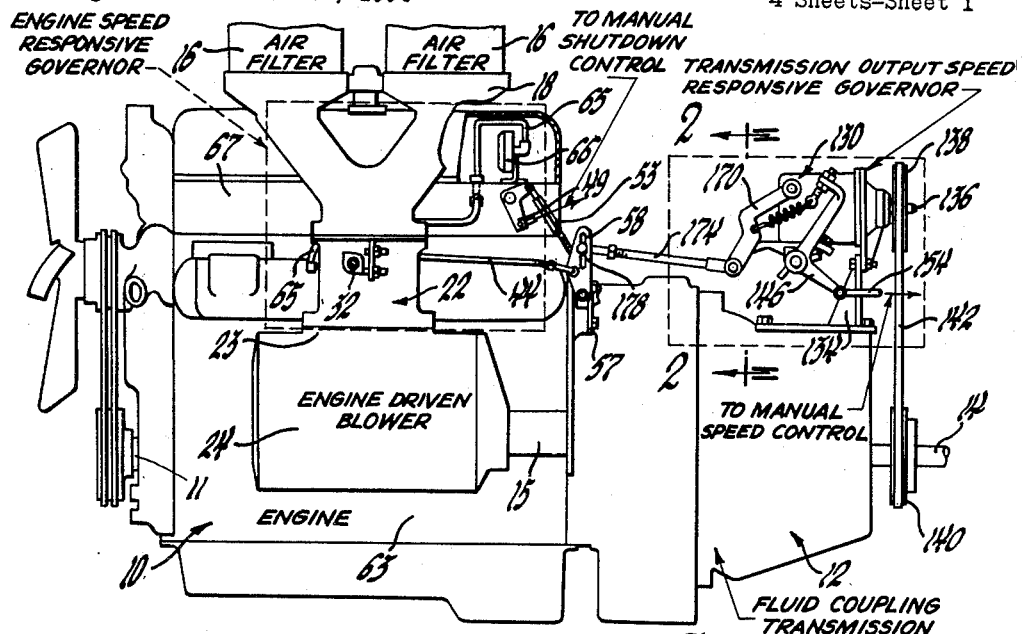
FIGURE 1 is a diagrammatic view in side elevation of an internal combustion engine power plant embodying a first form of control mechanism constructed in accordance with the invention.
Figure 2:
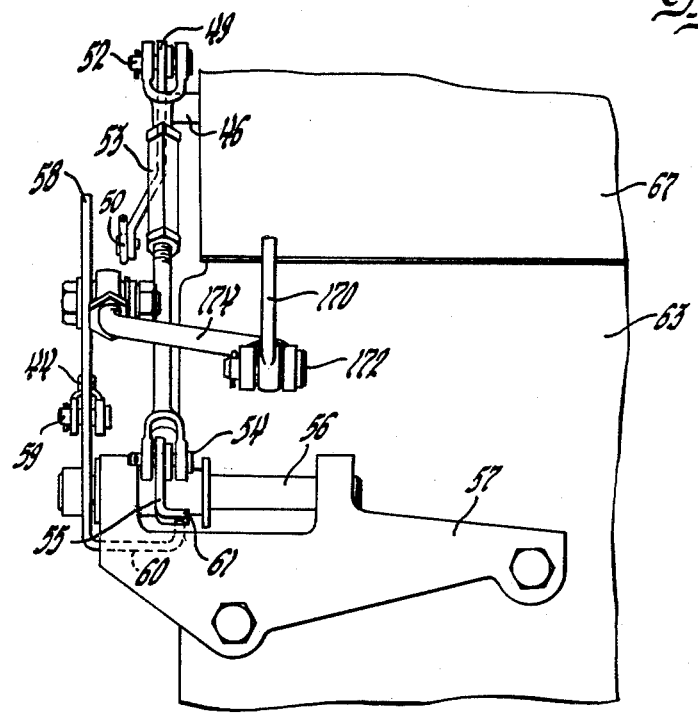
FIGURE 2 is a view showing certain details of a portion of the control mechanism of FIGURE 1 and is taken substantially on the line 2—2 of FIGURE 1.

Referring more particularly to the drawings, FIGURE 1 shows a power plant including an internal combustion engine 10 which for illustrative purposes is shown as a two-cycle diesel engine. The crankshaft 11 of the engine is drivingly connected to a power transmitting mechanism 12 including a fluid coupling, such as a torque converter, and an output shaft 14 driven by the engine through the coupling.

The combustion air intake system for the engine includes a Y-shaped coupling member 18 having an air receiving chamber 20 therein which is connected to the outlets of a pair of air filter units 16 which are mounted in parallel by the upper branches of the member 18. The outlet of the air receiving chamber 20 is connected through an air flow control valve mechanism 22 to the inlet 23 of an engine driven blower 24 of a positive-displacement type such as a Roots blower. The outlet of the blower, not shown, is connected to the scavenging air box of the engine, also not shown. The blower is drivingly connected to the engine at 15 through the power transmitting mechanism 12.

As shown by FIGURE 3, the air flow control valve mechanism 22 comprises a body member 25 having a main passage 26 and a secondary venturi bypass passage 38, both of which serve to connect the air receiving chamber 20 to the blower inlet 23. The main passage 26 is controllable by a butterfly valve 28 mounted on a shaft 30 which is journaled in the valve body transversely of the main passage. The ends of the shaft 30 project externally of the body member 25 and an air valve stop cam 32 secured to one end of the shaft is provided with two projecting lug portions 32a and 32b which contact two adjustment screws 34 and 36, respectively, threadably mounted in a flange portion 37 formed on the body member 25 to provide angular idle and maximum engine speed limits for the closing and opening, respectively, of the air valve 28. A lever 40 secured to the opposite end of the shaft 30 forms a crank arm which is pivotally connected at 42 to a link 44 which is operable, as described in detail below, to control the operation of the valve 28.

Air flow in the venturi passage 38 develops a sub-atmospheric depression of air pressure at its throat proportional to the engine or blower intake vacuum as determined by the speed of the engine and the position of the air flow control valve 28. This sub-atmospheric pressure condition at the venturi throat is applied through a bleed passage 64 and a conduit 65 to one end of a housing 66 mounted on the cylinder head 67 by the bracket 68; the two ends of the housing being separated by a flexible diaphragm or piston member 69. The opposite end of the housing 66 is perforated at 70 thereby subjecting the opposite side of the diaphragm to atmospheric pressure and providing an opening for a link 71 which operably interconnects the diaphragm 69 with the upper end of a fuel control lever 72. As best seen in FIGURE 4, the lever 72 is pivotally supported by a bracket 76 and is connected at its lower end to an axially movable fuel control member 73, such as an injector control rack, by a pin-and-slot connection 74. A helical spring 75 is torsionally interposed between the bracket 76 and the lower portion of the lever 72 and biases the lever 72 and the fuel control member 73 in a fuel-increasing direction in opposition to the tendency of the vacuum applied to the diaphragm to move these elements in a fuel-decreasing direction.

During normal operation there is no mechanical connection provided between the air valve 28 and the control lever 72. However, a connecting linkage is provided, as shown in FIGURES 1, 2, 3 and 4 for normally releasing a leaf-type buffer spring 45 from biasing engagement with the upper end of control lever 72 except when the air valve 28 is in its engine "idle" position. When the air valve 28 is in its "idle" position, the buffer spring 45 is moved into biasing engagement with the lever 72, and its biasing effect is effectively added to the fuel-increasing biasing action in opposition to the increased engine vacuum thereby maintaining engine operation above "stall" speed. This linkage includes a shaft 46 which is pivotally mounted in the cylinder head 67. The end of the buffer spring 45 is suitably attached to the shaft 46. A lever 47 is also secured to the shaft 46, the upper portion of which is provided with a pin 48 engageable with and causing the lower portion of the lever 72 to carry the fuel control member 73 to a fuel "off" or engine shutdown position when the shaft 46 is rotated in a counterclockwise direction. A bell-crank lever 49 is mounted on the end of the shaft 46 which projects outwardly from the cylinder head, and a manually operable link 50 pivotally connected at 51 to the lower arm of this lever serves to rotate the lever 49, the shaft 46, and the lever 47 in a counterclockwise direction causing the pin 48 to move the lever 72 to move the member 73 to a fuel-off position and thus obtain engine shutdown. The other arm of the lever 46 is pivotally connected at 52 to one end of an adjustable turnbuckle link 53. The other end of the link 53 is pivotally connected at 54 to an arm of a lever 55. The lever 55 is pivotally mounted on a shaft 56 which is supported by a bracket 57 mounted on the rear of the engine block 63. An operating lever 58 is also pivotally mounted on the shaft 56 in axially spaced relation to the lever 55. This lever 58 is provided with a pivotal connection at 59 with the air flow control valve operating link 44 and is operable, as discussed in detail below, to vary the opening of the control valve 28 thereby controlling the engine or blower intake vacuum and, consequently, the sub-atmospheric application of pressure to the diaphragm 69. When the operating lever 58 is rotated counterclockwise to its engine "idle" position moving the valve 28 to its "closed" position, a pickup flange 60 formed on the operating lever 58 engages a similar coacting flange 61 formed on the lever 55 causing the lever 55 to rotate in a counterclockwise direction. This counterclockwise rotation of the lever 55 is transmitted through the link 53, the lever 49, and the shaft 46, rotating the spring 45 into biasing engagement with the lever 72 thereby establishing and maintaining engine "idle" speed.

It will be noted that the above-described combination of an air flow control valve mechanism and a fuel-controlling diaphragm mechanism constitutes a conventional fuel control mechanism of the variable-speed vacuum-governor type which is responsive to the speed of the engine as controlled by any given setting of the air valve 28. The structure and operation of this engine speed responsive governor is shown and described in somewhat greater detail in United States Patent No. 2,617,396 to Charles E. Ervin, Jr.

Assuming a fixed position of the air valve 28, a momentary decrease in engine speed results in decreased air flow through the venturi with a consequent drop in the vacuum force applied to the diaphragm 58. This lessened diaphragm actuating force allows the torsional spring 75 to rotate the lever 72 in a fuel-increasing direction; a movement transferred to the individual injectors by the axially movable member 73. This fuel-increasing movement will continue until a new condition of balance is achieved between the spring and vacuum forces. Conversely, a momentary increase in engine speed will result in greater venturi air flow with the consequent application of a greater vacuum force on the diaphragm tending to rotate the lever 72 in a fuel-decreasing direction until a condition of balance is again attained between the spring and diaphragm forces. With such a governor, assuming constant load conditions, the engine speed is controlled by the position of the air valve 28. By opening the air valve, the air velocity through the venturi is reduced, consequentially decreasing the fuel-decreasing vacuum force on the diaphragm and allowing the control spring to increase fuel delivery until a balanced condition is reached thereby establishing a higher governed engine speed. Conversely, closing of the air valve from a given position serves to increase the venturi flow, and the resulting increased vacuum force applied to the diaphragm decreases fuel delivery to bring about a new balanced condition at a lower governed engine speed. The control valve 28 thus serves to adjust the speed controlling action or speed responsive characteristic of the engine governor by controlling the engine or blower intake vacuum and consequently the sub-atmospheric pressure applied to the vacuum governor diaphragm 69.

In the forms of the invention shown in FIGURES 1–4, the control valve 28 is connected to a variable-speed governor 130 which is responsive to the speed of the power transmitting output shaft 14. As best shown in FIGURE 3a, the governor 130 comprises a housing 132 which is suitably mounted on the rear of the power transmitting mechanism 12 by a bracket 134. A shaft 136 is rotatably journaled within the housing 132 and a pulley 138 secured to one end thereof is drivingly connected to a pulley 140 secured to the output shaft 14 by a belt 142. A conventional centrifugal flyball governor mechanism, not shown, is mounted on the shaft 136 within the housing 132 and is operably connected by suitable means, also not shown, to rotate a shaft 144 journaled in the housing transversely to the shaft 136 in a clockwise direction as the flyweights are caused to move outwardly in response to the speed of the output shaft. A lever 146 pivotally mounted at 148 by a bracket 150 secured to the housing 132 is provided with a downwardly extending arm which is pivotally connected at 152 to a manually operable control link 154. The control link 154 may be shifted remotely by suitable accelerator control linkages, not shown. The lever 146 is provided with two lugs which are engageable with screws 182 and 184 threadably mounted in the bracket 150 to form stops limiting the pivotal movement of the lever 146. A second arm on the lever 146 includes a lateral projection 156 which mounts a threaded eye-bolt 158, the adjusted position of which is locked by nuts 160 and 162. One end 164 of a tension-type speeder spring 166 is secured to the eye of the eyebolt 158 and the other end 168 of the speeder spring is secured intermediate the ends of a lever 170, one end of which is rigidly secured to the speed-responsive shaft 144. The opposite end of the lever 170 is pivotally connected at 172 to one end of a floating link 174 which is pivotally connected at its other end to the operating lever 58 as indicated at 178.

The links 174 and 44 are provided with threadable axial adjustment at 176 and 43, respectively, intermediate their ends and the pivotal connection 178 is adjustable by means of the slot 180 as shown, or by other suitable means to vary the effective length of the lever 58 about its pivot 56. The provided adjustments in the control linkages make it possible to vary the modifying action of the output shaft governor on the engine operation to achieve the desired engine and output shaft operating characteristics.

As shown in FIGURES 3 and 3a, the various components of the control system are in "idle" position. In operation when the control link 154 is moved to the left in an engine speed-increasing direction, the lever 146 is rotated in a clockwise direction increasing the biasing effect of the speeder spring 166 on the lever 170 in opposition to the tendency of the centrifugal flyweights to move outwardly in response to the speed of the output shaft. This increased biasing effect results momentarily in the collapse of the flyweights permitting the rotation of the shaft 144 and the lever 170 in a counterclockwise direction. This movement is consequentially transferred to the link 174, the operating lever 58, the link 44, and the control valve lever 40 thereby rotating the control valve 28 in an opening direction. The movement of the operating lever 58 also releases the idle buffer spring 45 out of biasing engagement with the lever 72 as explained above. The opening of the control valve 28 reduces the air flow through the venturi passage 38 and the amount of vacuum applied to the diaphragm 69. This permits the torsional spring 75 to move the lever 72 and the fuel control member 73 in a fuel-increasing direction with resultant increases in the operating rates of the engine and the output shaft 14.

When the speed of the output shaft 14 is again sufficient to move the flyweights outwardly against the biasing effect of the speeder spring 166, the lever 170 will be rotated slightly in a clockwise direction until a balance is achieved between the biasing effect of the spring and the centrifugal forces acting on the flyweights and consequential closing movements of the control valve 28 occurs until a new balance is achieved between the vacuum being applied to the diaphragm and the biasing effect of the spring 75. The components of the control system will act in a similar manner when load is applied to the output shaft 14 momentarily resulting in a decrease in the output shaft speed from the desired level as determined by the position of the lever 146. The converse operation will occur between the various components of the control system when the control link 154 is moved in a speed-decreasing direction or when load is removed from the output shaft momentarily resulting in a higher output shaft speed relative to the setting of the lever 146; the resulting outward movement of the flyweights causing the shaft 144 and lever 170 to be rotated in a counterclockwise direction thereby moving the control valve 28 in a closing direction until a new balance is achieved between the biasing components of both governors. It will thus be seen that the variable-speed output shaft governor modifies the engine or blower intake vacuum to maintain the speed of the output shaft at a relatively constant value with both increasing or decreasing applications of load.

In the form of the invention shown in FIGURES 5 and 6, the engine speed responsive vacuum governor is essentially the same as that shown and described with reference to FIGURES 1–4 except for its engine speed modifying connection to the transmission output speed responsive governor. To avoid needless drawing duplication, however, the engine shutdown control partially shown in the drawings of the now abandoned parent application S.N. 477,857 has been omitted in FIGURE 5. As preferably associated with the vacuum valve controlling link 44, this shutdown control is adequately disclosed in FIGURES 2 and 4 as described above. Hence, the engine governor of this embodiment need not be shown and described in great detail, like reference numerals having been used to identify the same governor components.

Figure 5:
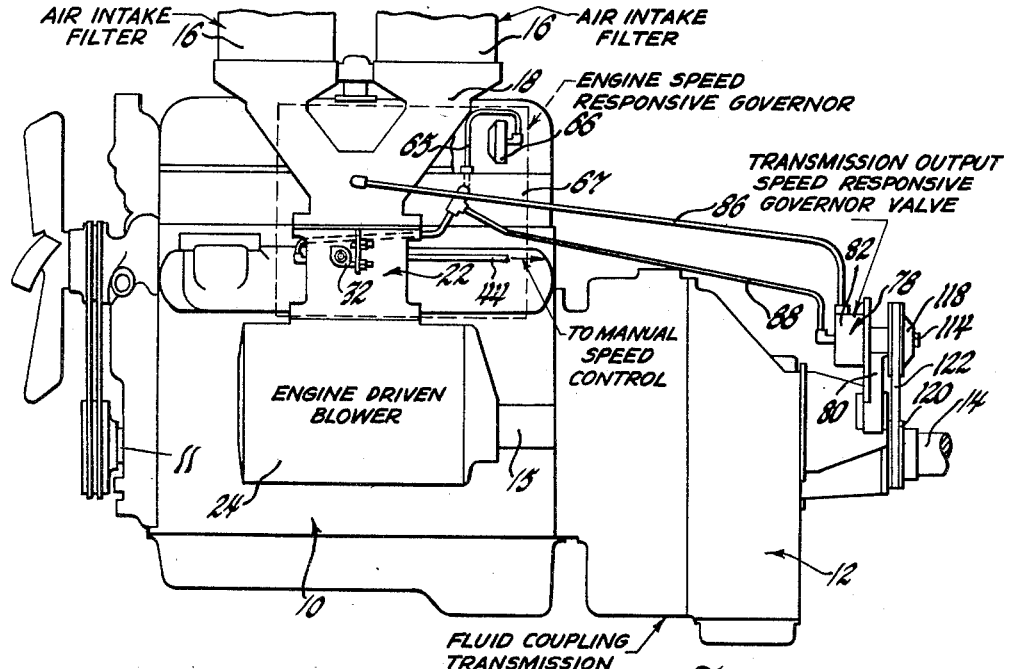
FIGURE 5 is a diagrammatic view similar to FIGURE 1 and shows an internal combustion engine power plant embodying a second form of control mechanism constructed in accordance with the invention.
Figure 6:
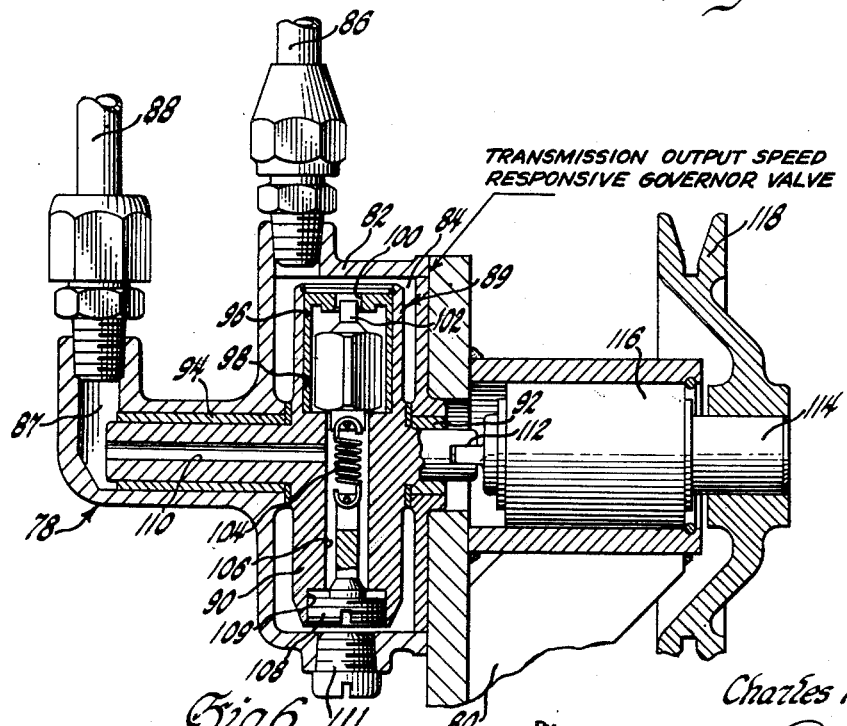
FIGURE 6 is an enlarged view of a portion of FIGURE 5 with parts broken away and in section.

In the embodiment of FIGURES 5 and 6, the engine speed responsive characteristic of the vacuum governor is initially established by manual adjustment of the valve 28 to provide a desired output shaft speed. To maintain this desired shaft speed with variations in load, the operation or speed responsive characteristic of the vacuum governor is modified by a variable orifice governor 78 which bleeds air into the conduit 65 in accordance with the output shaft speed thereby modulating the fuel-decreasing application of engine vacuum to the diaphragm 69. The governor 78 comprises a housing 82 mounted to the rear of the power transmitting mechanism 12 by the bracket 80. As shown in FIGURE 6, the housing 82 has an air inlet chamber 84 connected by a conduit 86 to the air receiving chamber 20 and having an outlet chamber 87 connected by a conduit 88 to the conduit 65. By connecting the chamber 84 to the chamber 20 rather than directly to the atmosphere, filtered air at an intermediate sub-atmospheric pressure is utilized in the reduction of the engine speed proportional vacuum at the venturi throat which is being applied to the diaphragm. A variable orifice assembly 89 is rotatably mounted within the chamber 84 and includes a carrier member 90 having two diametrically opposed radial portions extending transversely of the chamber 84 and two axially extending shaft portions journaled in bearings 92 and 94. A cup-shaped insert 96 mounted in a counterbore 98 formed in one of the radial portions of the carrier member is provided with a radial port or orifice 100, the effective size of which is controlled by a valve member 102 reciprocably mounted within the cup-shaped insert. A spring 104 mounted within a bore 106 coaxial with the counterbore 98 and the radial portions of the member 90 serves to bias the valve member 102 in an orifice-open position in opposition to the speed-responsive centrifugal forces tending to move the valve member 102 radially outwardly in an orifice-closing direction; the spring 104 being connected at one end to the valve member and at its opposite end to a member 108 which is threadably mounted in another counterbore 109 formed in the radial portion of the member 90 opposite the orifice carrying portion. A bore 110 provided in one of the axially extending shaft portions of the carrier member interconnects the bore 106 with the outlet chamber 87. The other axially extending shaft portion of the member 90 is provided with a transverse key-and-slot connection 112 with one end of a stub shaft 114. The stub shaft 114 is rotatably journaled in a bearing 116 carried by the bracket 80. A pulley 118 is connected to the opposite end of shaft 114 and is drivingly connected by a belt 122 to a pulley 120 mounted on the fluid coupling output shaft.

In operation the variable orifice output shaft governor is set so that the orifice just closes at the desired maximum no-load output shaft r.p.m. This is accomplished by varying the rate of the spring 104 by adjustment of the member 108 through a plug opening 111 provided in the housing member 82. The maximum-speed limit screw 36 for the butterfly valve 28 controlling the engine speed-responsive vacuum governor is also adjusted to give the desired maximum no-load output shaft speed. Assuming the valve 28 in its maximum speed or wide open position, as load is applied to the output shaft the speed of the output shaft is temporarily reduced consequentially reducing the centrifugal forces acting on the variable orifice valve 102. This causes the valve 102 to open to a degree dependent upon the reduction in output shaft speed with a proportional bleeding of air to reduce the venturi-generated vacuum applied to the diaphragm. The torsion spring 75 of the vacuum governor will then tend to move the lever 72 to an increased-fuel position until a new balance is established between the control spring and the diaphragm action on the control lever. This results in a gradual increase in the engine speed tending to maintain the converter output shaft speed constant with increasing load until the full power output of the engine is reached. The converse will occur with decreasing loads. Similarly, at intermediate settings of the control valve 28, the tendency of the orifice valve 102 to further open or close with a reduction or increase, respectively, in output shaft speed will serve to maintain the speed of the output shaft at a constant value with increased or decreased application of load.

From the foregoing description, it will be apparent that the above-described embodiment of the power plant control or governing system of the illustrative embodiments are applicable to internal combustion engine power plants generally to modify the load droop characteristics. In power plants utilizing couplings of a type having inherent slippage characteristics, use of such a governing system provides for a relative increase in engine speed with increase in load which will consequentially serve to maintain the rate of operation of the output shaft at a substantially constant value. Such operation permits higher engine power output at more efficient points of operation for both the engine and the coupling.

While only two specific embodiments of the invention have been shown and described for the purposes of illustration, it is appreciated that various modifications may be made therefrom without departing from the spirit and scope of the invention as defined in the following claims.

I claim:

1. In a power plant including an engine and a power transmitting mechanism driven thereby, said power transmitting mechanism including an output shaft drivingly connectable to a variable load and having operating characteristics whereby the speed of the output shaft tends to decrease with the application of load thereto more rapidly than the speed of the engine: a control mechanism comprising fuel supply means for supplying variable amounts of fuel to the engine and including a control member movable between an off position in which it conditions said supply means to substantially cut off the supply of fuel to the engine, an intermediate position in which it causes fuel to be supplied to the engine at a restricted rate permitting said engine to operate at a low idling speed, and an open position in which it conditions said fuel supply means to supply fuel to the engine at a maximum rate, means for normally biasing said fuel supply control member toward its open position, means responsive to the speed of the engine and operably connected to actuate said fuel supply control member in a decreasing fuel direction between said open and intermediate fuel supply controlling positions in opposition to said biasing means to vary the engine fuel supply in accordance with deviations from a selectively established engine speed to maintain such established engine speed, said engine speed responsive means including means for selectively establishing the engine speed from which deviations render said engine speed responsive means effective to actuate said fuel supply control member, means responsive to the speed of the output shaft and including an output member movable in response to deviations from a selectively established speed of said output shaft, a control element movable through an operating zone between a first and second position and operably connected to selectively establish the output shaft speed from which deviations effect movement of said output member, and means operably connecting said engine speed selecting means to the output member of said output shaft speed responsive means, whereby said fuel supply control member is actuated alternatively in a fuel increasing or decreasing direction by said biasing and engine speed responsive means between said intermediate and open fuel supply controlling positions in accordance with actuation of said engine speed selecting means by said shaft speed responsive output member indicating respectively a decreasing or increasing speed deviation from the selectively established output shaft speed to thereby maintain the output shaft speed selectively established by the positioning of the output shaft speed control element in said operating zone.

2. In a power plant including an engine and a power transmitting mechanism driven thereby, said power transmitting mechanism including an output shaft drivingly connectable to a variable load, and said mechanism having operating characteristics whereby the speed of said output shaft tends to decrease with the application of load to said output shaft more rapidly than the speed of said engine decreases: a control mechanism comprising fuel supply means for supplying variable amounts of fuel to said engine and including a control member movable between an off position in which it conditions said supply means to substantially cut off the supply of fuel to said engine, an intermediate position in which it causes fuel to be supplied to said engine at a restricted rate permitting said engine to operate at a low idling speed, and an open position in which it conditions said fuel supply means to supply fuel to said engine at a maximum rate, means for normally biasing said fuel supply control member toward its open position, means responsive to the speed of said engine and operable in accordance with deviations from a selectively established engine speed to actuate said fuel supply control member in a decreasing fuel direction between said open and intermediate fuel supply controlling positions in opposition to said biasing means to vary the engine fuel supply so as to maintain such established engine speed, said engine speed responsive means including an element movable through an operating zone between a first position and a second position to selectively establish the engine speed to be maintained by said engine speed responsive means, and means responsive to the speed of said output shaft and including a power output member operably connected to adjust the position of said speed establishing element in said operating zone to change the engine speed maintained by the fuel supply regulating operation of said engine speed responsive means and thereby maintain said load driving output shaft at a desired constant speed.

3. In a power plant including an engine and a power transmitting mechanism driven thereby, said power transmitting mechanism including an output shaft drivingly connectable to a variable load, and said mechanism having operating characteristics whereby the application of load tends to decrease the speed of said output shaft more rapidly than the speed of said engine decreases: a control mechanism comprising fuel supply means for supplying variable amounts of fuel to said engine and including a control member movable between an off position in which it conditions said supply means to substantially cut off the supply of fuel to said engine, an intermediate position in which it causes fuel to be supplied to said engine at a restricted rate permitting said engine to operate at a low idling speed, and an open position in which it conditions said fuel supply means to supply fuel to said engine at a maximum rate, means for normally biasing said fuel supply control member toward its open position, means responsive to the speed of said engine and operably connected to actuate said fuel supply control member between said open and intermediate fuel supply positions in opposition to said biasing means to maintain a selectively established engine speed, said engine speed responsive means including a control element movable through an operating range between first and second positions to establish the engine speed to be maintained by the fuel supply controlling action of said engine speed responsive means, means responsive to the speed of said output shaft and including a power output member operably connected to actuate the control element of said engine speed responsive means to adjust the engine speed to be maintained by the fuel supply controlling action of said engine speed responsive means and thereby the engine driven speed of said output shaft in response to deviations from a selectively established output shaft speed, and a manually operable element movable through an operating zone between a first position and a second position and operably connected to selectively established the output shaft speed to be maintained by operation of said last-mentioned means in accordance with the movement of said manually controlled element in said operating zone.

4. A control mechanism for a power plant including an engine and a power transmitting mechanism including an output shaft drivingly connected therethrough to said engine, said control mechanism comprising means for controlling the fuel supply to the engine, means responsive to the speed of said engine and operably connected to modify the fuel supplying function of said fuel supply means to maintain the engine at a selected constant speed, means for varying the selected constant engine speed maintained by the fuel supply controlling operation of said engine speed responsive means, means responsive to the speed of said output shaft and including a power member operably connected to actuate said last mentioned means to vary the selected engine speed maintained by the fuel supply controlling action of said engine speed responsive means in accordance with variations in the speed of the output shaft to thereby maintain the output shaft at a selected constant speed, and said output shaft speed responsive means including a control element operably connected and selectively movable through a range to establish the constant output shaft speed maintainable by speed responsive movement of the power member of said output shaft speed responsive means.

5. A control mechanism for a power plant including an engine, a power transmitting coupling drivingly connected to said engine and an output shaft driven through said coupling, said coupling having load-speed droop characteristics differing from those of said engine, said control mechanism comprising an engine fuel regulating member, an engine air supply means including a main passageway, a valve movable between opened and closed positions to modify engine intake air flow through said main passageway, and a venturi bypassing said valve and in parallel with the main passageway, said venturi being effective to cause a subatmospheric depression proportional to the engine intake air flow passing therethrough and indicative of engine speed for any given position of said valve, piston means connected to and responsive to the engine speed indicating subatmospheric depression of air in said venturi and operably connected to actuate the fuel regulating member to maintain said engine at a constant speed corresponding to the position of said valve, and means responsive to the speed of said output shaft and including a power output member operatively connected to actuate said valve between its opened and closed positions to modulate the engine intake air flow in said main passage and venturi to cause said piston means to actuate the fuel regulating member to compensate for changes in the speed of said output shaft thereby maintaining said output shaft at a desired constant speed.

6. In a control mechanism for a power plant including an engine and a fluid coupling including an output shaft drivingly connectable to said engine, an engine combustion air receiving chamber having an outlet, means for conducting air to the engine from said outlet including a main passage, a valve movable between opened and closed positions controlling said main passage, and a venturi bypassing said valve and effective to cause a subatmospheric air pressure proportional to the engine intake air flow passing therethrough and indicative of engine speed for any given position of said valve, means including a fuel control member movable in opposite directions to increase and decrease the engine fuel supply, a pivoted two-arm lever having one arm drivingly connected to said fuel control member, resilient means biasing said lever in a fuel-increasing direction, an air cylinder having one end in communication with the atmosphere and its other end closed to the atmosphere and in communication with said venturi, a flexible diaphragm separating the respective ends of said air cylinder and drivingly connected to the other arm of said lever, and governor means responsive to the rate of operation of said output shaft and including a speed responsive power output member operably connected to vary the effective opening of said valve in accordance with deviations from a desired selectively established output shaft speed thereby controlling the engine fuel supply to maintain the desired engine driven output shaft speed.

7. In a control mechanism as set forth in claim 6, said output shaft responsive governor means comprising a speed responsive mechanism driven by said output shaft, said output member being movable by said speed responsive mechanism to actuate said valve between its opened and closed positions in accordance with decreasing and increasing speed deviations from the desired output shaft speed, and manually operable control means including a control element movable through a control range to modify the speed setting response of said speed responsive mechanism to establish the desired output shaft speed.

References Cited in the file of this patent

UNITED STATES PATENTS

| 1,868,130 | Bauer et al. | July 19, 1932 |
| 2,398,878 | Bolli | Apr. 23, 1946 |
| 2,617,396 | Ervin | Nov. 11, 1952 |
| 2,628,470 | Orton | Feb. 17, 1953 |
| 2,657,918 | Parker | Nov. 3, 1953 |
| 2,721,072 | Zuhn et al. | Oct. 18, 1955 |
| 2,727,501 | Worth | Dec. 20, 1955 |

FOREIGN PATENTS

| 468,060 | Italy | Dec. 29, 1951 |
| 112,141 | Sweden | Oct. 17, 1944 |